United States Patent
Yakovlev et al.

(10) Patent No.: US 11,319,476 B2
(45) Date of Patent: May 3, 2022

(54) CELLULOSE NANOFIBERS IN EXTENDED CEMENT SYSTEMS

(71) Applicant: Schlumberger Technology Corporation, Sugar Land, TX (US)

(72) Inventors: Andrey Yakovlev, Houston, TX (US); Giselle Refunjol, Houston, TX (US); Mei Ho, Houston, TX (US); Bernhard Lungwitz, Houston, TX (US)

(73) Assignee: SCHLUMBERGER TECHNOLOGY CORPORATION, Sugar Land, TX (US)

(*) Notice: Subject to any disclaimer, the term of this patent is extended or adjusted under 35 U.S.C. 154(b) by 3 days.

(21) Appl. No.: 16/985,490

(22) Filed: Aug. 5, 2020

(65) Prior Publication Data

US 2020/0377778 A1    Dec. 3, 2020

Related U.S. Application Data

(62) Division of application No. 15/947,169, filed on Apr. 6, 2018, now abandoned.

(51) Int. Cl.
| | | |
|---|---|---|
| C09K 8/10 | (2006.01) | |
| C09K 8/473 | (2006.01) | |
| C04B 18/24 | (2006.01) | |
| C04B 20/00 | (2006.01) | |
| C04B 28/02 | (2006.01) | |
| C09K 8/467 | (2006.01) | |
| C09K 8/70 | (2006.01) | |
| B82Y 30/00 | (2011.01) | |
| C04B 103/00 | (2006.01) | |
| E21B 33/14 | (2006.01) | |
| B82Y 40/00 | (2011.01) | |

(52) U.S. Cl.
CPC .............. *C09K 8/473* (2013.01); *C04B 18/24* (2013.01); *C04B 20/006* (2013.01); *C04B 28/02* (2013.01); *C09K 8/10* (2013.01); *C09K 8/467* (2013.01); *C09K 8/70* (2013.01); *B82Y 30/00* (2013.01); *B82Y 40/00* (2013.01); *C04B 2103/0079* (2013.01); *C09K 2208/08* (2013.01); *C09K 2208/10* (2013.01); *E21B 33/14* (2013.01)

(58) Field of Classification Search
CPC ....................................................... C09K 8/00
See application file for complete search history.

(56) References Cited

U.S. PATENT DOCUMENTS

| | | | |
|---|---|---|---|
| 4,721,160 A * | 1/1988 | Parcevaux | ............... C04B 28/02 166/293 |
| 9,133,384 B2 | 9/2015 | Rincon-Torres et al. | |
| 2012/0071370 A1 | 3/2012 | Falana et al. | |
| 2013/0274149 A1 | 10/2013 | Lafitte et al. | |
| 2014/0153353 A1 | 6/2014 | Koskinen et al. | |

(Continued)

FOREIGN PATENT DOCUMENTS

WO    2014148917 A1    9/2014

*Primary Examiner* — William D Hutton, Jr.
*Assistant Examiner* — Avi T Skaist

(57) ABSTRACT

Methods herein may include injecting a cement slurry having an aqueous base fluid, a cement, and a plurality of cellulose nanofibers dispersed in the aqueous base fluid. The plurality of cellulose nanofibers may be present in the slurry in an amount effective to provide a slurry density of not higher than 15 lb/gal.

17 Claims, 6 Drawing Sheets

(56) References Cited

U.S. PATENT DOCUMENTS

| | | | |
|---|---|---|---|
| 2015/0072902 A1* | 3/2015 | Lafitte | C09K 8/44 |
| | | | 507/112 |
| 2016/0168443 A1 | 6/2016 | Lafitte et al. | |
| 2017/0226398 A1* | 8/2017 | Shimaoka | C08B 5/00 |
| 2018/0148630 A1 | 5/2018 | Yakovlev et al. | |

* cited by examiner

CELLULOSE NANOFIBERS IN EXTENDED CEMENT SYSTEMS

PRIORITY

This is a divisional application, claiming the benefit of copending U.S. patent application Ser. No. 15/947,169, filed on Apr. 6, 2018.

BACKGROUND

Cementing is a common well operation. The main purpose of primary well cementing is to isolate different formation zones to prevent fluid migration between different geological layers or to the surface. In cementing operations carried out in oil, gas and water wells, a hydraulic cement composition is normally mixed with sufficient water to form a pumpable slurry. Hydraulic cement is a material that when mixed with water hardens or sets over time because of a chemical reaction with the water. Because this is a chemical reaction with the water, hydraulic cement is capable of setting even under water. The hydraulic cement, water, and any other components are mixed to form a hydraulic cement composition in the initial state of a slurry, which should be a fluid for a sufficient time before setting for pumping the composition into the wellbore and for placement in a desired downhole location in the well.

The cement slurry is pumped across a subterranean zone or zones to be cemented through a casing and placed in the annulus between the casing and the borehole. After placement across the zone or zones, the cement slurry sets into a hard mass. The cement stabilizes the pipe in the wellbore and prevents undesirable migration of fluids along the wellbore between various zones of subterranean formations penetrated by the wellbore.

In the case of weak formations, the use of low-density cement systems is desired to reduce the hydrostatic pressure of the fluid column during cement placement, as well as to prevent cement losses. Neat cement slurries, when prepared from API Class A, C, G, or H cements, have a density above 15 lb/gal. In order to formulate a cement slurry with a density lower than 15 lb/gal, lightweight additives (extenders) may be used. Any material with a specific gravity lower than cement will act as an extender. Some extenders may also absorb water, allowing more water to be added to the cement slurry without segregation.

A reduction of slurry density reduces the hydrostatic pressure during cementing; this helps to cement oil and gas wells in low pressure or depleted reservoirs and prevent induced lost circulation because of the breakdown of weak formations. In addition, the number of stages desired to cement a well may be reduced. Extenders reduce the amount of cement used to produce a given volume of set product which results in a greater economy. Different types of cement extenders additives, such as bentonite, pozzolans, microspheres and foam cement are used for preparing light weight cement slurry.

DETAILED DESCRIPTION

Figure 1:
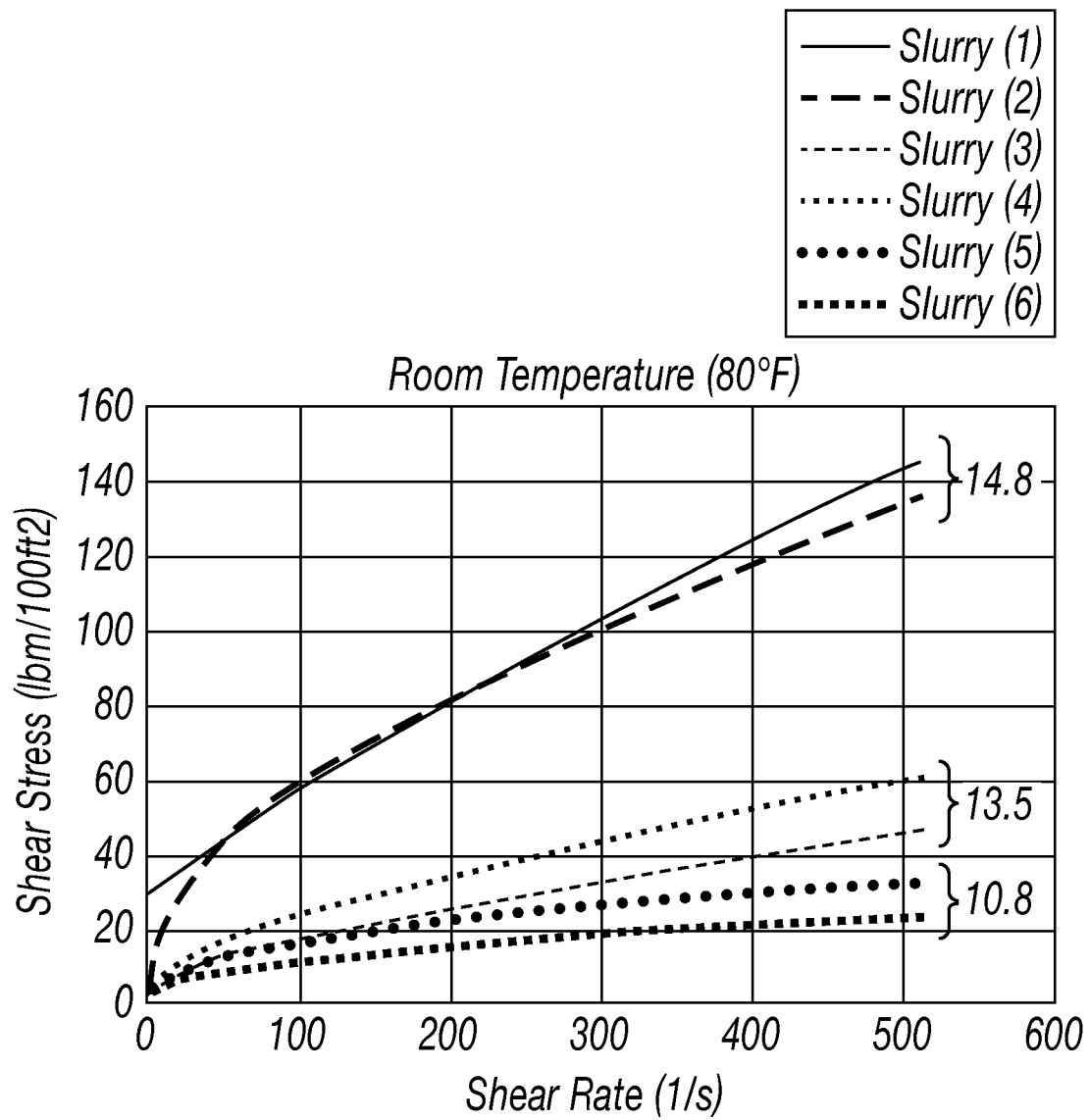
FIGS. 1-4 show rheology measurements of cement slurries with bentonite and CNF according to embodiments of the present disclosure.

Generally, embodiments disclosed herein relate to treatment fluids for subterranean formations and methods of using the same. More specifically, embodiments disclosed herein relate to cement slurries for treating a wellbore, the cement slurries being formed of an aqueous base fluid, a cement and a plurality of cellulose nanofibers dispersed in the aqueous base fluid. The inventors of the present disclosure have found that the use of cellulose nanofibers in cement slurries may provide for lightweight cement systems that exhibit a density of not higher than 15 lb/gal, while increasing the slurry yield.

While most of the terms used herein will be recognizable to those of skill in the art, the following definitions are nevertheless put forth to aid in the understanding of the present disclosure. It should be understood, however, that when not explicitly defined, terms should be interpreted as adopting a meaning presently accepted by those of skill in the art.

The present disclosure is directed to the use of nanocellulose materials as an extender for lightweight cement systems. As used herein, an extender is a lightweight additive such as a chemical additive or inert material used to reduce the weight of a cement slurry. Thus, an extender decreases the density, while increasing the yield of a cement slurry. As defined herein, the slurry yield represents the volume of slurry obtained when one sack of cement is mixed with the desired amount of water and other additives, given in units of $m^3/kg$ or $ft^3/sk$ (sack). Increasing the yield reduces the cost per volume of cement slurry, specifically reduces the amount of cement used to produce a given volume, while reducing the slurry density decreases the hydrostatic pressure of the cement column during cementing, enabling weak zones to be successfully cemented and isolated.

According to the present embodiments, the cement slurries of the present disclosure incorporate a nanocellulose material, such as a plurality of nanocellulose fibers, that can be dispersed or suspended in a base fluid. Without being bound by the theory it is believed that hydrophilicity and high surface area of nanocellulose may allow the nanocellulose material to absorb a specific amount of water and create viscous gels. Thus, upon addition to cement slurries, nanocellulose may soak excessive water and increase the slurry yield, while also extending the cement (reducing the density). Additionally, nanocellulose may also increase the cement slurry viscosity and elasticity. In contrast, regular extenders such as bentonite that is used as an extender in cement slurries may create issues due to its stability and variability due to variations in the natural product.

As defined herein, nanocellulose may refer to at least three different types of nanocellulose materials, depending on the fabrication method and the source of the natural fibers. These three types of nanocellulose materials are: a) nanocrystalline cellulose (NCC) or crystalline nanocellulose (CNC), b) microfibrillated cellulose (MFC), nanofibrillated cellulose (NFC) or nanofibrils (also known as cellulose nano, CNF), and c) bacterial cellulose (BC), which will be described later in greater detail. Cellulose fibers and their derivatives constitute one of the most abundant renewable polymer resources available on earth. Different types of cellulose fibers and/or particles may be used in cementing or wellbore strengthening/consolidation fluids for viscosifying various fluids.

The cellulose fibers that have shown utility in the present disclosure are selected from the group of cellulose nanofibers. As described herein, nanofibers are defined as having at least one dimension of less than 1 micron. The cellulose nanofibers of the present disclosure may increase the viscosity of the cement slurry, while also acting as extenders that may decrease the density of the cement slurry into which they are dispersed or suspended, increasing the slurry yield.

According to the present embodiments, the cellulose nanofibers may be added in the cement slurry in an amount effective to provide a specific slurry density. For example, according to various embodiments, cellulose nanofibers are added in a cement slurry in an amount effective to provide a slurry density of not higher than 15 lb/gal. In one or more embodiments, the density of the cement slurry may range from about 6 lb/gal to about 15 lb/gal, where the lower limit can be any of 6 lb/gal, 7 lb/gal or 8 lb/gal and the upper limit can be any of 10 lb/gal, 14 lb/gal or 15 lb/gal where any lower limit can be used with any upper limit. In one or more embodiments, the concentration of the cellulose nanofibers present in the cement slurry may range from about 0.03% to about 6% by weight of blend, where the blend refers to all solid materials in the slurry including cement. However, the amount of the cellulose nanofibers added depends on the type of cellulose nanofibers used.

According to the present embodiments, the addition of the cellulose nanofibers in the cement slurry may have an effect of increasing the slurry yield. More specifically, it was observed that the higher the aspect ratio of the nanocellulose particles, the greater the rheology modification of the cement systems. According to one or more embodiments, the cellulose nanofibers may have a length ranging from about 100 nm to about 3 mm, where the lower limit can be any of 100 nm, 150 nm or 200 nm and the upper limit can be any of 1 mm, 2 mm or 3 mm, where any lower limit can be used with any upper limit. In such embodiments, the cellulose nanofibers may have a diameter ranging from about 4 nm to about 20 μm, where the lower limit can be any of 4 nm, 5 nm or 6 nm and the upper limit can be any of 18 μm, 19 μm or 20 μm, where any lower limit can be used with any upper limit. According to the present embodiments, the addition of the cellulose nanofibers to the slurry may increase the slurry yield. In such embodiments, the slurry yield may be increased by 1 to 3 feet cubed per sack depending on the slurry density.

In one or more embodiments, the cellulose nanofibers may be selected from the group of cellulose nanofibrils (CNFs) and cellulose nanocrystals (CNCs) which both originate from wood as raw material. First stage of the process is pulping when lignin is removed from cellulose. Mechanical disintegration of the obtained pulp fibers may yield cellulose nanofibrils, which may be further turned into cellulose nanocrystals by acid hydrolysis. According to the present embodiments, the amount of the cellulose nanofibers added to the slurry may depend on the type of the nanocellulose. For example, in embodiments where the cellulose nanofibrils are used, the concentration of the cellulose nanofibrils present in the slurry may range from about 0.03 to about 2.5% by weight of the blend. In embodiments where cellulose nanocrystals are used, the concentration of the cellulose nanocrystals present in the slurry may range from about 0.2 to about 6% by weight of the blend.

Nanocellulose

Cellulose is the world's most abundant biopolymer on earth. It is natural, renewable, and biodegradable. The cellulose microfiber varies in length depending on the cellulose species. Cellulose fibers and their derivatives constitute one of the most abundant renewable polymer resources available on earth. Different types of cellulose fibers and/or particles may be used for example in stimulation, drilling and cementing fluids for viscosifying various fluids.

Once synthesized, the cellulose microfiber contains a crystalline part, which is highly insoluble in water, and some non-crystalline parts, which have been referred to as amorphous cellulose. The crystalline cellulose is able to make a strong network, which is believed to be based on intermolecular hydrogen-bonding. However, in its most common natural state, cellulose microfibers show an amorphous region. The amorphous region of the cellulose microfibers allows for water to penetrate.

Nanocellulose materials may have a repetitive unit of β-1,4 linked D glucose unit, as seen in the following chemical structure:

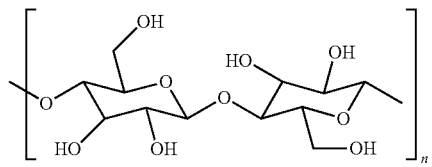

The integer values for the variable n relate to the length of the nanocellulose chains, which generally depends on the source of the cellulose, as well as the part of the plant containing the cellulose material.

In some embodiments, n may be an integer of from about 100 to about 10,000, such as from about 1,000 to about 10,000, or from about 1,000 to about 5,000. In other embodiments, n may be an integer of from about 5 to about 100. In other embodiments, n may be an integer of from about 5000 to about 10,000. In various embodiments, the nanocellulose may include fibers or chains that may have an average diameter of from about 1 nm to about 1000 nm, such as from about 10 nm to about 500 nm, or 50 nm to about 100 nm.

Nanocrystalline cellulose (NCC), also referred to as cellulose nanocrystals, cellulose whiskers, or cellulose rod-like nanocrystals, or crystalline nanocellulose (CNC) can be obtained from cellulose fibers. However, cellulose nanocrystals may have different shapes besides rods. Examples of these shapes include any nanocrystal in the shape of a 4-8 sided polygon, such as, a rectangle, hexagon or octagon. NCCs are generally made via the hydrolysis of cellulose fibers from various sources such as cotton, wood, wheat straw and cellulose from algae and bacteria. These cellulose fibers are characterized in having two distinct regions, an amorphous region and a crystalline region.

In one or more embodiments, the cellulose nanoparticles may include NCC prepared through acid hydrolysis of the amorphous and disordered paracrystalline regions of cellulose fibers that have a lower resistance to acid attack as compared to the crystalline regions of cellulose fibers. During the hydrolysis reaction, the amorphous and disordered paracrystalline regions of the cellulose fibers are hydrolyzed, resulting in removal of microfibrils at the defects. This process also results in rod-like nanocrystalline cellulose particles or more simply "NCC particles" having a crystalline structure. In various embodiments, the hydrolysis process may be conducted under mild conditions such that the process does not result in any considerable degradation or decomposition rod-like crystalline portion of the cellulose. Consequently, NCC particles with "rod-like" shapes (herein after referred to as "rod-like nanocrystalline cellulose particles" or more simply "NCC particles") having a crystalline structure are produced.

The NCC particles may be exceptionally tough, with a strong axial Young's modulus (150 GPa) and may have a morphology and crystallinity similar to the original cellulose fibers (except without the presence of the amorphous). In some embodiments, the degree of crystallinity can vary from about 50% to about 100%, such as from about 65% to about 85%, or about 70% to about 80% by weight. In some embodiments, the degree of crystallinity is from about 85% to about 100% such as from about 88% to about 95% by weight.

Techniques that are commonly used to determine NCC particle size are scanning electron microscopy (SEM), transmission electron microscopy (TEM) and/or atomic force microscopy (AFM). Wide angle X-ray diffraction (WAXD) may be used to determine the degree of crystallinity.

In some embodiments, the NCCs or NCC particles may have a surface that is closely packed with hydroxyl groups, which allows for chemical modifications to be performed on their surfaces. In one or more embodiments, some of the hydroxyl groups of the NCC or NCC particles may have been modified or converted prior to, during, and/or after introduction into the wellbore, such as to a sulfate or phosphate ester group, during acid digestion. In some embodiments, some of the hydroxyl groups of the NCC or NCC particles surface may have been modified or converted to be carboxylated.

In one or more embodiments, the choice of the method to prepare the NCCs or NCC particles (and thus the resultant functional groups present on the surface of the NCCs or NCC particles) may be used to tailor the specific properties of the fluids comprising the NCCs or NCC particles. For example, fluids comprising NCCs or NCC particles may display a thixotropic behavior or antithixotropic behavior, or no time-dependent viscosity. For instance, fluids incorporating hydrochloric acid-treated NCCs or NCC particles may possess thixotropic behavior at concentrations above 0.5% (w/v), and antithixotropic behavior at concentrations below 0.3%) (w/v), whereas fluids incorporating sulfuric acid treated NCCs or NCC particles may show no time-dependent viscosity.

In one or more embodiments, the NCC or NCC particles may be functionalized to form a functionalized NCC particle, such as a functionalized NCC particle in which the outer circumference of the nanocrystalline cellulose has been functionalized with various surface modifiers, functional groups, species and/or molecules. For example, such chemical functionalizations and/or modifications may be conducted to introduce stable negative or positive electrostatic charges, hydrophobic functional groups on the surface of NCCs or NCC particles. Introducing electrostatic charges or hydrophobic groups on the surface of NCCs or NCC particles may allow for better dispersion in the desired solvent or medium.

Micro Fibrillated Cellulose (MFC), nanofibrillated cellulose (NFC) or nanofibrils (also known as cellulose nanofibrils, CNF), is a form of nanocellulose derived from wood products, sugar beet, agricultural raw materials or waste products. In MFC or CNF, the individual microfibrils have been incompletely or totally detached from each other.

One common way to produce MFC (or CNF) is the delamination of wood pulp by mechanical pressure before and/or after chemical or enzymatic treatment. Additional methods include grinding, homogenizing, intensification, hydrolysis/electrospinning and ionic liquids. Mechanical treatment of cellulosic fibers is energy consuming and this has been a major impediment for commercial success.

MFC may be similar in diameter to the NCC particle, but MFC is more flexible because NCC particles may have a very high crystalline content (which limits flexibility). For example, in contrast to the high crystalline content of NCC particles, which may be homogeneously distributed or constant throughout the entire NCC particle, MFCs contain distinct amorphous regions, such as amorphous regions that alternate with crystalline regions, or amorphous regions in which crystalline regions are interspersed. Additionally, MFCs possess little order on the nanometer scale, whereas NCC particles are highly ordered. Furthermore, the crystallinity of MFCs may approach 50%, whereas the crystallinity of NCCs is higher and will depend on the method of production. MFC and NFC may be surface functionalized during the manufacturing process, typically through TEMPO oxidation conferring some carboxylate groups. They may also be functionalized after production because the surface contains reactive hydroxyl groups. The nature of the surface may therefore be altered such that it may be more compatible with its environment.

Bacterial nanocellulose may also be used in the methods of the present disclosure. Bacterial nanocellulose is a material obtained via a bacterial synthesis from low molecular weight sugar and alcohol for instance. The diameter of this nanocellulose is found to be about 20-100 nm in general. Bacterial nanocellulose particles are microfibrils secreted by various bacteria that have been separated from the bacterial bodies and growth medium. The resulting microfibrils are microns in length, have a large aspect ratio (greater than 50) with a morphology depending on the specific bacteria and culturing conditions.

According to the present embodiments, the nanocellulose materials as described herein may be modified or non-modified. For example, the nanocellulose materials may be modified to be inactive (that is, the surface of the cellulose nanoparticles may be modified to have a composition such that a plurality of cellulose nanoparticles exhibits hindered aggregation or interaction tendency either with each other and/or with the rest of the additives in the treatment fluid or system) so the cellulose nanoparticles will not substantially increase the viscosity (e.g., the viscosity may not increase to more than about 1.05 times that of the base fluid to which the cellulose nanoparticles are being added, or the viscosity may not increase to more than about 1.05 times that of the viscosity of the base fluid to which the cellulose nanoparticles are being added) of the fluid (for example, the treatment fluid) at the time from when the cellulose nanoparticles are added to the fluid until a viscosity increase is desired. For example, in some embodiments, when the treatment fluid reaches the desired treatment zone (such as, for example, perforations), temperature, shear, and/or other factors may be adjusted to activate (or "trigger", such as by exposure to a predetermined temperature or shear force) the inactive nanocellulose particles such that the particles form a gel (for example, a single-phase colloidal suspension), which increases the fluid viscosity and/or yield stress. For example, the viscosity may increase to more than about 1.05 times that of the base fluid to which the cellulose nanoparticles are being added, or the viscosity may increase to more than about 1.5 times that of the viscosity of the base fluid to which the cellulose nanoparticles are being added, or the viscosity may increase to more than about 2 times that of the viscosity of the base fluid to which the cellulose nanoparticles are being added, or the viscosity may increase to more than about 5 times that of the viscosity of the base fluid to which the cellulose nanoparticles are being added.

Cementing

As previously noted, the cement slurries as described herein further include a cement. A variety of hydraulic cements can be utilized in accordance with the present application including, for example, portland cements, slag cements, silica cements, pozzolana cements, aluminous cements (e.g., calcium aluminate cement), lime-silica mixtures, zeolites, fly ashes, blast furnace slag and combinations thereof. Specific examples of portland cements include American Petroleum Institute (API) Classes A, B, C, G and H. Geopolymers and chemically bonded phosphate ceramics are also envisioned.

Generally, cementing a well includes pumping a cement slurry from the surface down the casing so that it then returns towards the surface via an annulus between the casing and the borehole. One of the purposes of cementing a well is to isolate the different formation layers traversed by the well to prevent fluid migration between the different geological layers or between the layers and the surface. For safety reasons, prevention of any gas rising through the annulus between the borehole wall and the casing is desirable.

When the cement has set, it is impermeable to gas. Because of the hydrostatic pressure of the liquid cement slurry column, the injected slurry is also capable of preventing such migration. However, there is a period between these two states that can last from several minutes to hours during which the cement slurry no longer behaves as a liquid but also does not yet behave as an impermeable solid. For this reason, additives may be added to maintain a gas-tight seal during the entire cement setting period. This activity is called gas migration control.

The concept of fluid loss is also observed in cement slurries. Fluid loss occurs when the cement slurry comes into contact with a highly porous, fissured or highly permeable formation. Fluid from the cement slurry may migrate into the formation, leaving the solids behind and altering the properties of the slurry. When fluid loss occurs it may create an unstable slurry that can make the cement harden faster than desired, which may lead to incomplete placement. Fluid loss control additives may be used to prevent or at least limit the fluid loss that may be sustained by the cement slurry during placement and setting.

It is also envisioned that the cement slurries as described herein may be foamed cement slurries. Foamed hydraulic cement slurries are commonly utilized in forming structures above and below ground. The gas employed to create the foam may comprise nitrogen or air. In forming the structures, the foamed hydraulic cement composition may be pumped into a form or other location to be cemented and allowed to set therein. Heretofore, foamed cement slurries have included foaming and stabilizing additives which include components such as isopropyl alcohol that interfere with aquatic life. In addition, one or more of the components may be flammable and render the shipment of the foaming and stabilizing additives expensive. In one or more embodiments, the foamed hydraulic cement slurries of the present disclosure may include environmentally benign foaming and stabilizing additives, such as NCCs or NCC particles, which do not include flammable components.

NCCs and/or NCC particles have substantially more surface areas than the conventional micro fibers. Because of this, NCCs and/or NCC particles may possess the unique capability of stabilizing the interface between liquid and gas phases of a foamed cement slurry. For instance, the homogeneity and quality ("quality" defined as the volume percentage of gas in the cement slurry) foamed cement slurries may be improved. This may allow for the minimization in the amount of foaming agents. Additionally, when compared to the conventional foamed cement at the same density, the incorporation of NCCs and/or NCC particles may also improve the cement mechanical strength and lower the cement permeability. The addition of NCCs and/or NCC particles may also enable foamed cement to reach a higher foam quality and thus further lower the set cement density. For instance, foamed slurries with qualities up to 35% or higher may be prepared.

In the construction and repair of wells such as oil and gas wells, foamed hydraulic cement slurries are often pumped into locations in the wells to be cemented and allowed to set therein. In primary well cementing, foamed cement slurries are extensively used to cement off shore deep water wells wherein they may encounter temperatures between 4.4° C. and 10° C. (40° F. and 50° F.). The foamed cement slurries may then be pumped into the annular spaces between the walls of the well bores and the exterior surfaces of pipe strings disposed therein. The foamed cement slurries are compressible which may prevent the inflow of undesirable fluids into the annular spaces and the foamed cement slurries set therein whereby annular sheaths of hardened cement are formed therein. The annular cement sheaths physically support and position the pipe strings in the well bores and bond to the exterior surfaces of the pipe strings to the walls of the well bores whereby the undesirable migration of fluids between zones or formations penetrated by the well bores may be prevented.

Foamed hydraulic cement slurries are commonly utilized in forming structures above and below ground. In forming the structures, the foamed hydraulic cement composition is pumped into a form or other location to be cemented and allowed to set therein.

The water or solvent in the foamed cement slurry may be fresh water, unsaturated salt solutions or saturated salt solutions. The gas employed to foam the cement slurry may comprise air or nitrogen. Generally, the gas may be present in the foamed cement slurry as gas bubbles at concentrations between 10% and 80%, 20% and 70%, 30% and 60%, 30% and 50% or 40% and 50% by volume of the slurry. Or, the gas concentration may be between 20% and 35% by volume of the slurry. Additional additives such as surfactants and foaming agents may also be included.

Addition of suitable amount of NCCs and/or NCC particles to common portland cement slurries minimizes free fluid formation and also minimizes the use of viscosifiers. The rheological behavior of cement slurries is more or less well described by the so-called Bingham plastic model. According to said model, the shear stress versus shear rate dependence is a straight line of slope PV (for plastic viscosity) and of initial ordinate Ty (for yield value). A further property of the slurry resides in the values of plastic viscosity PV and the yield value Ty. To achieve turbulent flow during displacement, a cement slurry should present a plastic viscosity and a yield value as low as possible.

Other additives may be present in the blend, such fillers, silica, fly ash, cenospheres, hollow glass beads, retarders, fluid loss prevention agents, dispersants, accelerators, antifoaming agents, rheology modifiers and combinations of thereof.

Base Fluid

Water based wellbore fluids may have an aqueous fluid as the base liquid. The aqueous fluid may include at least one of fresh water, sea water, brine, mixtures of water and water-soluble organic compounds and mixtures thereof. For example, the aqueous fluid may be formulated with mixtures of desired salts in fresh water. Such salts may include, but are not limited to, alkali metal chlorides, hydroxides, or carboxylates, for example. In various embodiments of the drilling fluid disclosed herein, the brine may include seawater, aqueous solutions wherein the salt concentration is less than that of sea water, or aqueous solutions wherein the salt concentration is greater than that of sea water. Salts that may be found in seawater include, but are not limited to, sodium, calcium, aluminum, magnesium, potassium, strontium, silicon, and lithium, and salts of chlorides, bromides, carbonates, iodides, chlorates, bromates, formates, sulfates, phosphates, nitrates, oxides, and fluorides. Salts that may be incorporated in a brine include any one or more of those present in natural seawater or any other organic or inorganic dissolved salts. Additionally, brines that may be used in the wellbore fluids disclosed herein may be natural or synthetic, with synthetic brines tending to be much simpler in constitution. In one embodiment, the density of the wellbore fluid may be controlled by increasing the salt concentration in the brine (up to saturation). In a particular embodiment, a brine may include halide or carboxylate salts of mono- or divalent cations of metals, such as cesium, potassium, calcium, zinc, and/or sodium.

Conventional methods may be used to prepare the cement slurries disclosed herein in a manner analogous to those normally used. A cement slurry is prepared that includes an aqueous base fluid, such as water, a cement and an extender that includes a plurality of cellulose nanofibers. The cement slurry is placed in the well. The slurry placement may occur during a primary cementing operation or a remedial cementing operation. Upon mixing, the cement slurries of the present embodiments may be used in wellbore operations, such as cementing and fluid loss treatment (including wellbore consolidation, etc. upon encountering lost circulation). Such operations are known to persons skilled in the art and involve pumping a wellbore fluid into a wellbore through an earthen formation and performing at least one wellbore operation while the wellbore fluid is in the wellbore.

One embodiment of the present disclosure includes a method for treating a subterranean formation penetrated by a wellbore. In such an illustrative embodiment, the method involves injecting a cement slurry into the wellbore and allowing the cement slurry to set.

In such embodiments, injecting includes pumping the cement slurry through the wellbore and into an annulus formed between the wellbore and a casing. In one or more embodiments, the method for treating a subterranean formation may further comprise performing a downhole application.

In one or more embodiments, the cement slurry includes an aqueous base fluid, a cement, and a plurality of cellulose nanofibers dispersed in the aqueous base fluid. In such embodiments, the plurality of cellulose nanofibers may be present in the slurry in an amount effective to provide a slurry density of not higher than 15 lb/gal. As previously discussed, in one or more embodiments, the density of the cement slurry may range from about 6 lb/gal to about 15 lb/gal. In such embodiments, the plurality of the cellulose nanofibers may be present in the cement slurry in a concentration ranging from about 0.03% to about 6% by weight of the blend.

EXAMPLES

The following examples are presented to further illustrate the properties of the cement slurries of the present disclosure, and should not be construed to limit the scope of the disclosure, unless otherwise expressly indicated in the appended claims.

To demonstrate the impact of cellulose nanofibers on cement slurries, a performance comparison of different extenders in cement slurries was carried out at room temperature and bottom hole circulating temperature (BHCT). The additives used as extenders included: bentonite (natural clay used as an extender for lightweight cements, baseline comparison), cellulose nanofibers (CNF), and crystalline nanocellulose (CNC) fibers. As defined herein, BWOB refers to "by weight of blend", where the blend refers to all solid materials in the slurry including cement.

The preparation of the slurries included on weighing the amount of dry components together (mixed homogenously), then separately weighing the liquid components in a blender cup. The blender cup was then placed on the base of the mixer (using an AMETEK Chandler Engineering Mixer, Model 3060). The mixer was set to run at 4,000 rpm and the dry components were added to the blender cup in no more than 15 seconds. After this time, the mixer speed was increased to 12,000 rpm for 35 seconds. This mixing procedure resulted in a homogenous slurry.

Example 1. Cellulose Nanofibers Alter Rheology of Cement Slurries of Various Densities The rheological properties of the slurries were measured using a concentric cylinder rheometer from OFI Testing Equipment (Model 800-8 speed electronic viscometer). The recipe of each cement slurry tested is found below in Tables 1-6. For these slurries, rheology was measured at 3 densities (14.8 lbm/gal., 13.5 lbm/gal, and 10.8 lbm/gal) for a baseline (with bentonite), and cellulose nanofibrils (CNF).

TABLE 1

Formulation of cement slurry 1 having 14.8 lbm/gal density. The cement slurry 1 was used as baseline.

| Density | 14.8 lbm/gal |
| --- | --- |
| BHCT | 190° F. |
| Blend | |
| Pozz: Class H | 50:50 |
| Additives | |
| Bentonite | 3.50% BWOB |
| Fluid Loss Additive | 0.22% BWOB |
| Retarder | 0.20% BWOB |
| Dispersant | 0.10% BWOB |
| Retarder | 1.00% BWOB |

TABLE 2

Formulation of cement slurry 2 having 14.8 lbm/gal density.

| Density | 14.8 lbm/gal |
| --- | --- |
| BHCT | 190° F. |
| Blend | |
| Pozz: Class H | 50:50 |
| Additives | |
| CNF | 0.30% BWOB |
| Fluid Loss Additive | 0.22% BWOB |
| Retarder | 0.20% BWOB |
| Dispersant | 0.10% BWOB |
| Retarder | 1.00% BWOB |

TABLE 3

Formulation of cement slurry 3 having 13.5 lbm/gal density. The cement slurry 3 was used as baseline.

| | |
|---|---|
| Density | 13.5 lbm/gal |
| BHCT | 190° F. |
| Blend | |
| Pozz: Class H | 50:50 |
| Additives | |
| Bentonite | 5% BWOB |
| Fluid Loss Additive | 0.30% BWOB |
| Retarder | 0.10% BWOB |
| Dispersant | 0.20% BWOB |
| Retarder | 1.40% BWOB |
| Anti-settling | 2.00% BWOB |

TABLE 4

Formulation of cement slurry 4 having 13.5 lbm/gal density.

| | |
|---|---|
| Density | 13.5 lbm/gal |
| BHCT | 190° F. |
| Blend | |
| Pozz: Class H | 50:50 |
| Additives | |
| CNF | 0.38% BWOB |
| Fluid Loss Additive | 0.30% BWOB |
| Retarder | 0.10% BWOB |
| Dispersant | 0.20% BWOB |
| Retarder | 1.40% BWOB |
| Anti-settling | 2.00% BWOB |

TABLE 5

Formulation of cement slurry 5 having 10.8 lbm/gal density. The cement slurry 5 was used as baseline.

| | |
|---|---|
| Density | 10.8 lbm/gal |
| BHCT | 150° F. |
| Blend | |
| Light Weight Cement | |
| Additives | |
| Bentonite | 10% BWOB |
| Fluid Loss Additive | 0.20% BWOB |
| Retarder | 0.80% BWOB |
| Viscosifier | 0.10% BWOB |
| Anti-settling | 3.00% BWOB |
| Anti-foam | 0.02 gal/sk |

TABLE 6

Formulation of cement slurry 6 having 10.8 lbm/gal density.

| | |
|---|---|
| Density | 10.8 lbm/gal |
| BHCT | 150° F. |
| Blend | |
| Light Weight Cement | |
| Additives | |
| CNF | 0.85% BWOB |
| Fluid Loss Additive | 0.20% BWOB |
| Retarder | 0.80% BWOB |
| Viscosifier | 0.10% BWOB |
| Anti-settling | 3.00% BWOB |
| Anti-foam | 0.02 gal/sk |

Figure 2:
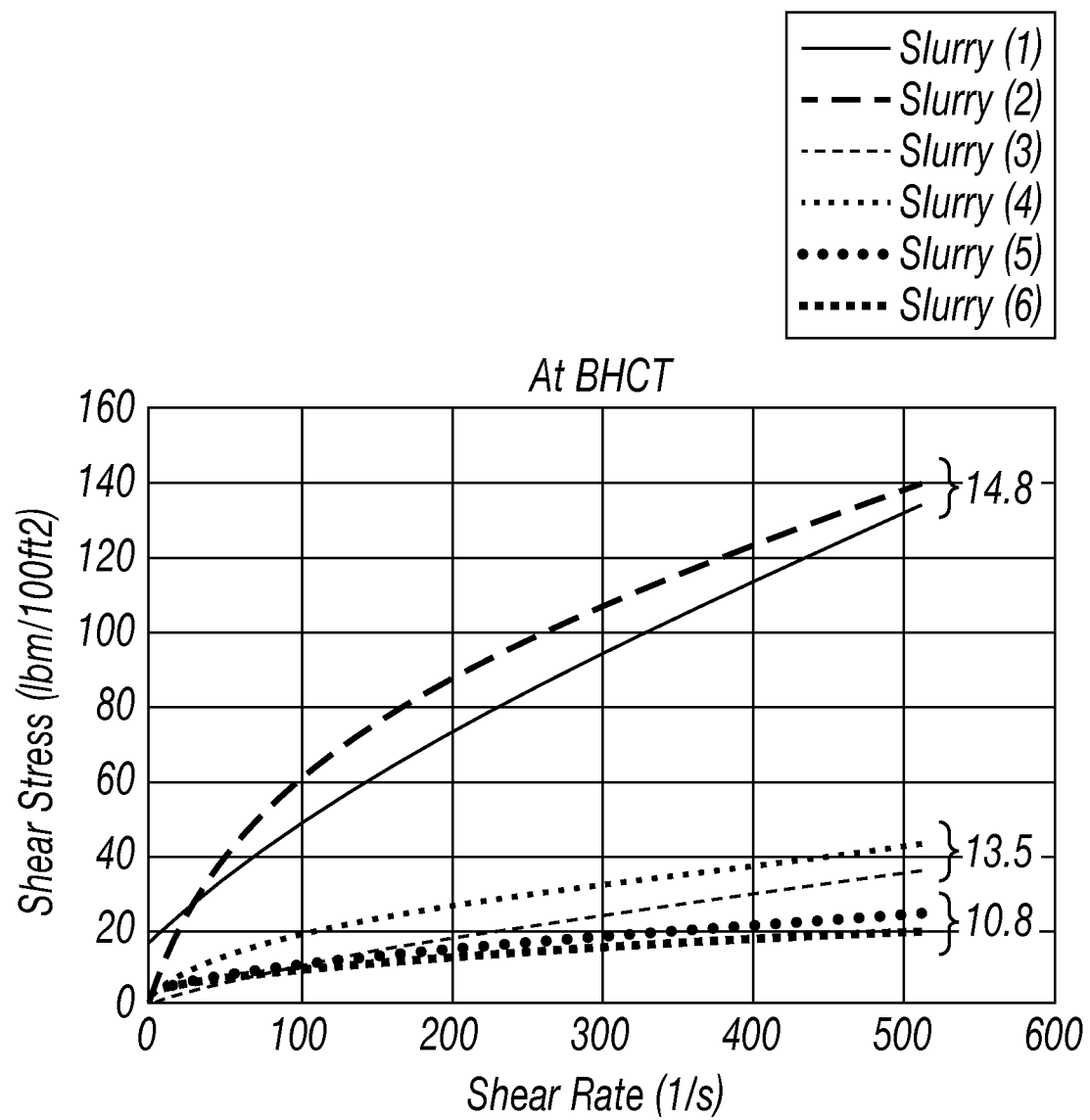

The results from the rheological measurements are shown in FIGS. 1 and 2, where the baseline slurries (with bentonite) are represented by the solid lines, and the slurries with CNF are shown in dashed lines. Referring now to FIG. 1, FIG. 1 depicts results of rheology measurements of cement slurries with bentonite and CNF at room temperature with varying slurry densities. Referring now to FIG. 2, FIG. 2 depicts results of rheology measurements of cement slurries with bentonite and CNF at bottom hole circulating temperature (BCHT) with varying slurry densities. At all densities measured, the rheology of the baseline slurry and the slurry containing CNF are comparable at both 80° F. and BHCT. Compared to the bentonite concentrations (slurries 1, 3, and 5), the concentration of equivalent CNF needed (slurries 2, 4, and 6) are roughly 90% less to obtain a similar rheological behavior at the same densities.

Example 2. Varying Concentration of CNF Alters Rheology of Cement Slurries

The rheological properties of the slurries were measured using a concentric cylinder rheometer from OFI Testing Equipment (Model 800-8 speed electronic viscometer). The formulations of the cement slurries tested are found in Table 7 with different concentrations of CNF. The formulations of the baseline slurries (with bentonite) are the same as those for Example 1 at the corresponding slurry density (slurry 1-14.8 lbm/gal, and slurry 3-13.5 lbm/gal). At 14.8 lbm/gal density, the concentration of CNF was 0.2% and 0.3% BWOB. At 13.5 lbm/gal density, the concentration of CNF was 0.43%, 0.38%, 0.33%, and 0.30% BWOB.

TABLE 7

Formulation of cement slurry with varying concentrations of CNF at 14.8 lbm/gal density.

| | |
|---|---|
| Density | 14.8 lbm/gal |
| BHCT | 190° F. |
| Blend | |
| Pozz: Class H | 50:50 |
| Additives | |
| CNF | 0.2% and 0.3% BWOB |
| Fluid Loss Additive | 0.22% BWOB |
| Retarder | 0.20% BWOB |
| Dispersant | 0.10% BWOB |
| Retarder | 1.00% BWOB |

TABLE 8

Formulation of cement slurry with varying concentrations of CNF at 13.5 lbm/gal density.

| | |
|---|---|
| Density | 13.5 lbm/gal |
| BHCT | 190° F. |
| Blend | |
| Pozz: Class H | 50:50 |
| Additives | |
| CNF | 0.43%, 0.38%, 0.33, and 0.30% BWOB |
| Fluid Loss Additive | 0.30% BWOB |
| Retarder | 0.10% BWOB |
| Dispersant | 0.20% BWOB |
| Retarder | 1.40% BWOB |
| Anti-settling | 2.00% BWOB |

Figure 3:
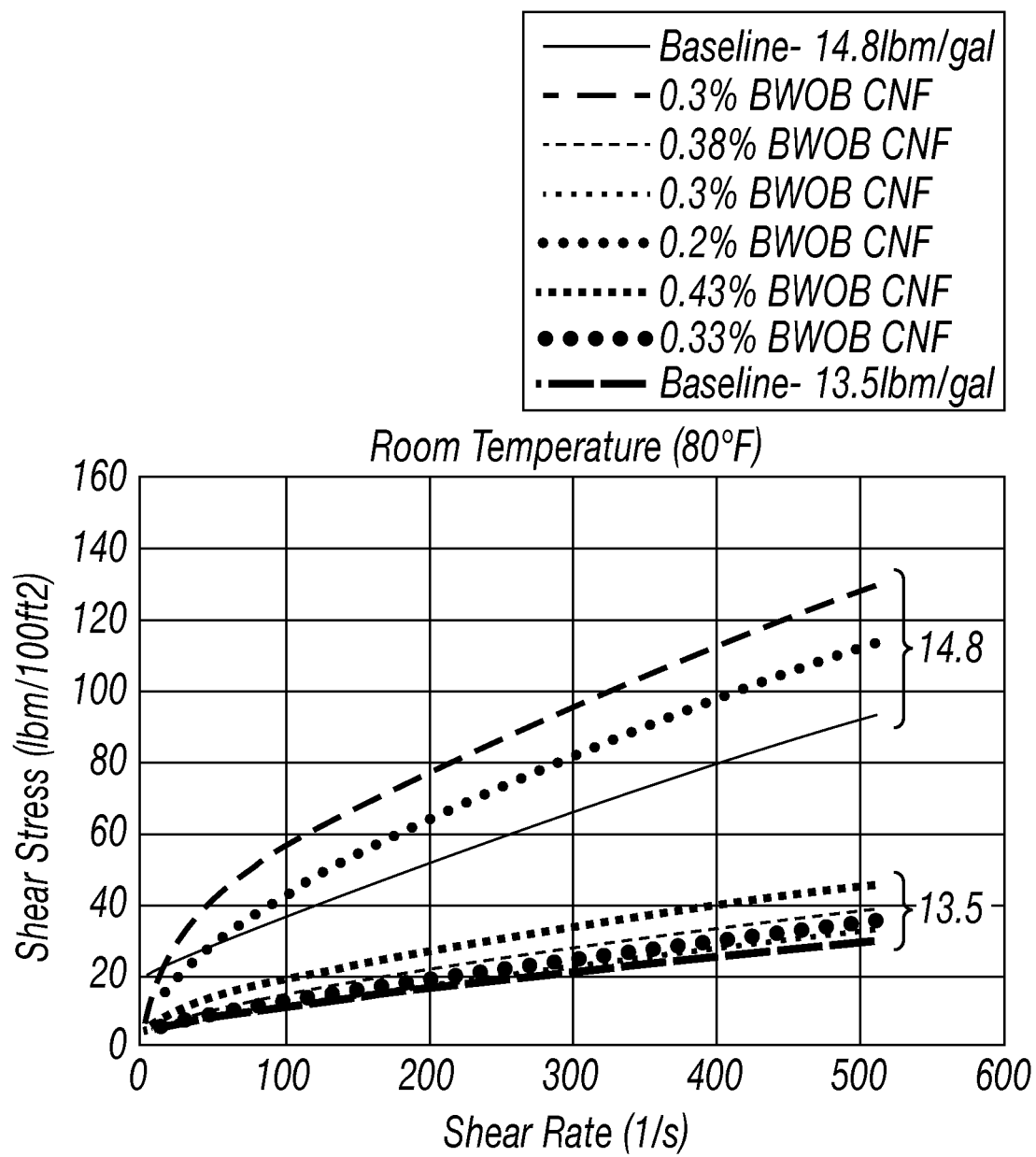
Figure 4:
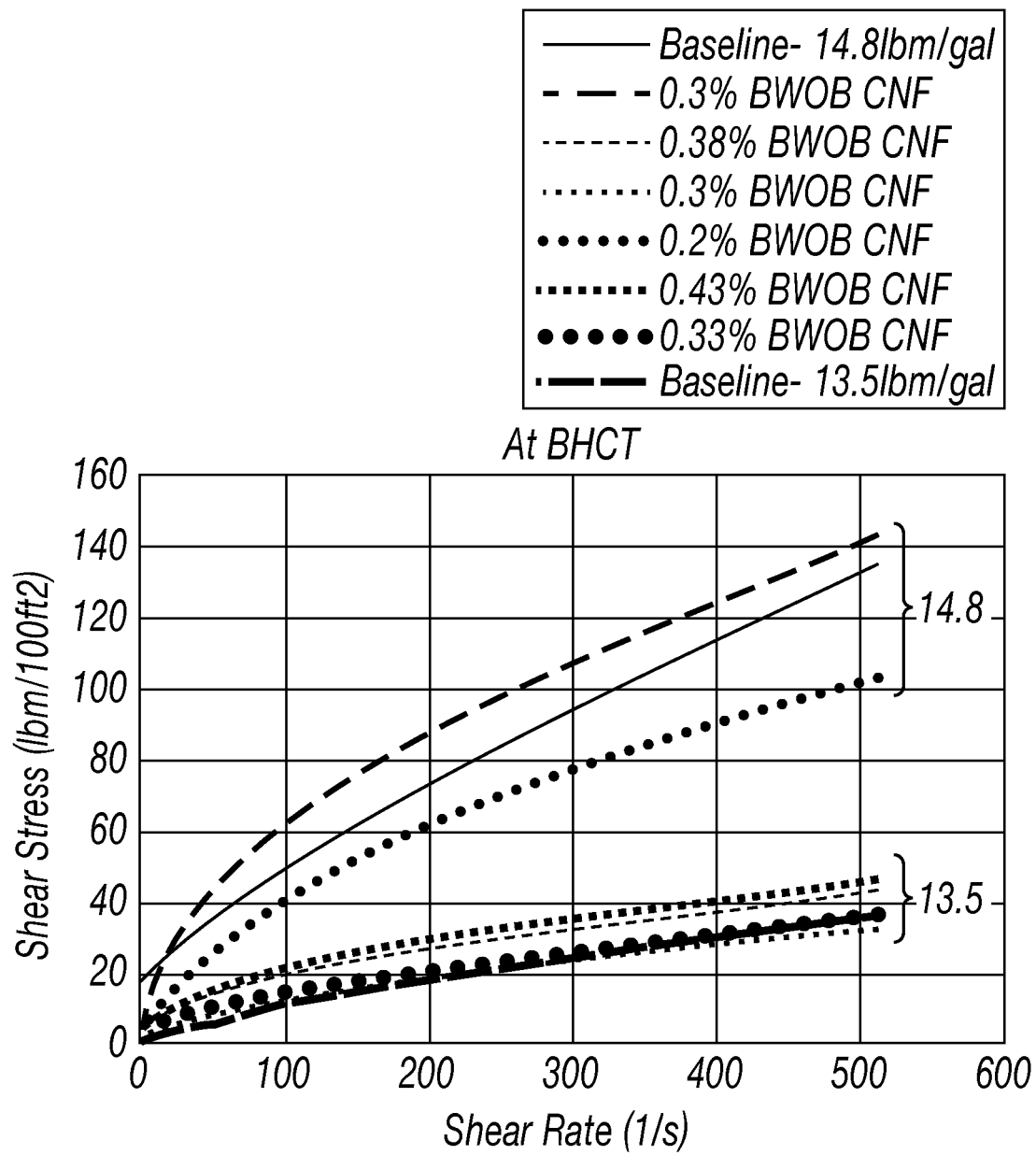

The results from the rheological measurements are shown in FIGS. 3 and 4, where the higher density (14.8 lbm/gal)

slurries are represented by the solid lines, and the lower density slurries (13.5 lbm/gal) by the dashed lines. Referring now to FIGS. 3 and 4, FIGS. 3 and 4 depict the results of rheology measurements of cement slurries with bentonite and CNF at room temperature (FIG. 3) and CNF at bottom hole circulating temperature (BCHT) (FIG. 4), respectively, with varying CNF concentrations.

At 14.8 lbm/gal, it is shown that the change in concentration of CNF affects the rheology. A 0.1% BWOB increase in CNF concentration increases the viscosity of the slurry at both room temperature and BHCT. At 13.5 lbm/gal, the results show that increasing the concentration of CNF fibers by 0.03% BWOB has an increased effect in viscosity, noticeable at both room temperature and BCHT. The addition of CNF to a cement slurry may create an impact on the slurry rheology by adding small concentrations, as low as 0.03% BWOB.

Examples 3. Varying Concentration of CNC Alters Rheology of Cement Slurries

The rheological properties of the slurries were measured using a concentric cylinder rheometer from OFI Testing Equipment (Model 800-8 speed electronic viscometer). The formulations of the cement slurries tested are found in Tables 9 and 10 with different concentrations of CNC. The formulations of the baseline slurries (with bentonite) are the same as those for Example 1 at the corresponding slurry density (slurry 1-14.8 lbm/gal, and slurry 3-13.5 lbm/gal). At 14.8 lbm/gal density, the concentration of CNC was 0.75% and 1.00% BWOB. At 13.5 lbm/gal density, the concentration of CNC was 1.40% BWOB.

TABLE 9

Formulation of a cement slurry with varying concentrations of CNC at 14.8 lbm/gal density.

| Density | 14.8 lbm/gal |
|---|---|
| BHCT | 190° F. |
| Blend | |
| Pozz: Class H | 50:50 |
| Additives | |
| CNC | 0.75% and 1% BWOB |
| Fluid Loss Additive | 0.22% BWOB |
| Retarder | 0.20% BWOB |
| Dispersant | 0.10% BWOB |
| Retarder | 1.00% BWOB |

TABLE 10

Formulation of a cement slurry with varying concentrations of CNC at 13.5 lbm/gal density.

| Density | 13.5 lbm/gal |
|---|---|
| BHCT | 190° F. |
| Blend | |
| Pozz: Class H | 50:50 |
| Additives | |
| CNC | 1.40% BWOB |
| Fluid Loss Additive | 0.30% BWOB |
| Retarder | 0.10% BWOB |
| Dispersant | 0.20% BWOB |
| Retarder | 1.40% BWOB |
| Anti-settling | 2.00% BWOB |

Figure 5:
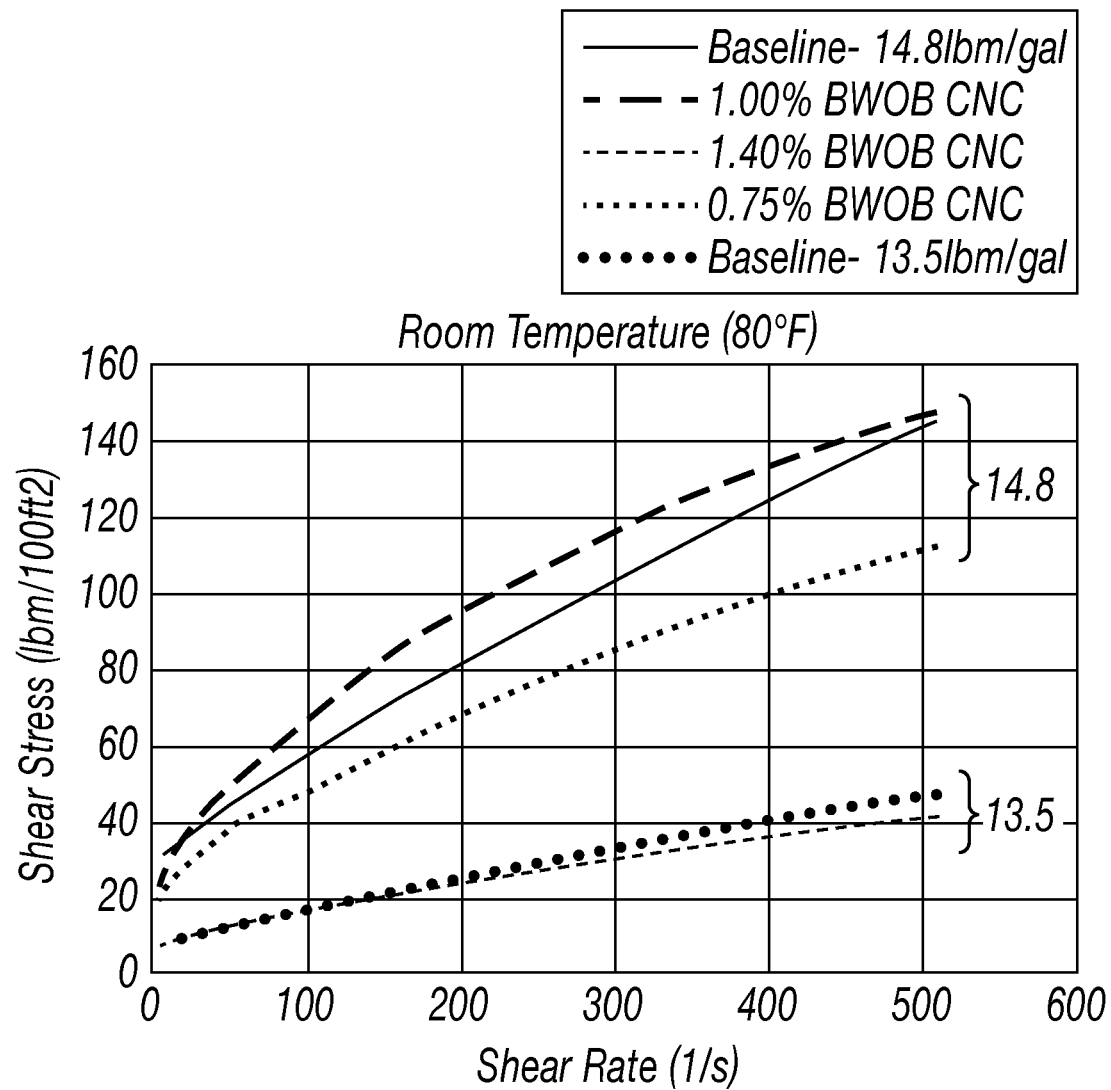
FIGS. 5 and 6 show rheology measurements of cement slurries with bentonite and CNC according to embodiments of the present disclosure.
Figure 6:
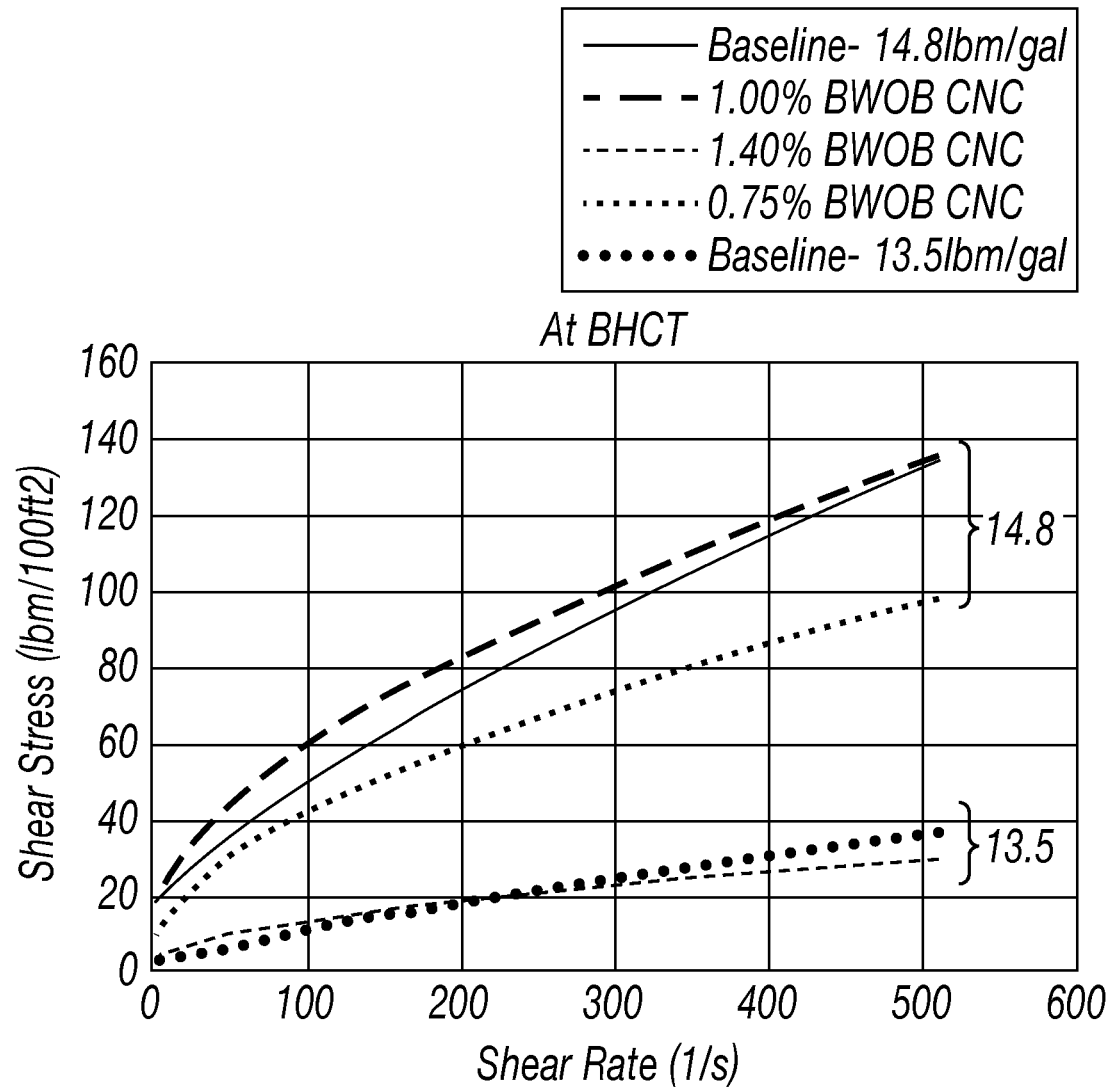

The results from the rheological measurements are shown in FIGS. 5 and 6, where the higher density (14.8 lbm/gal) slurries are represented by the solid lines, and the lower density slurries (13.5 lbm/gal) by the dashed lines. Referring now to FIGS. 5 and 6, FIGS. 5 and 6 depict the results of rheology measurements of cement slurries with bentonite and CNC at room temperature (FIG. 5) and at bottom hole circulating temperature (BCHT) (FIG. 6), respectively, with varying CNC concentrations.

At 14.8 lbm/gal, it is shown that the change in concentration of CNC affects the rheology. A 0.25% BWOB increase in CNC concentration increases the viscosity of the slurry at both room temperature and BHCT. At 13.5 lbm/gal, the results show that a concentration of 1.40% BWOB is needed to match the rheology of bentonite at both room temperature and BHCT, while 1.00% BWOB of CNC is needed at 13.5 lbm/gal. The concentration of equivalent CNC needed is roughly 70% less to obtain a similar rheological behavior to the bentonite baseline at the same densities. In comparison to CNF, the concentrations of CNC needed to obtain similar rheology behaviors as that with bentonite is higher than for CNF. From Example 2, the concentration of CNF needed was 0.2-0.3% BWOB at 14.8 lbm/gal, while at the same density a concentration of 1.00% BWOB CNC is used. The same is observed at a lower slurry density (13.5 lbm/gal), at least 0.3% BWOB of CNF versus 1.40% BWOB of CNC needed.

Examples 4. Cellulose Nanofibers do not Affect the Stability of the Extended Cement Slurry The ability of cellulose nanofibers to prevent excessive free fluid in the extended cement slurries was evaluated. The same cement formulations as in Example 1 (CNF) and Example 3 (CNC) were tested. 250 ml of each slurry was poured into graduated cylinders, after conditioning the slurry for 30 min at BHCT (190° F. or 150° F.), and left for 2 hours. In an unstable cement, liquid can come out of the slurry and form a layer of free fluid above the cement in the graduated cylinder. After conditioning the slurries and letting stand for 2 hours, the studied cement slurries showed little to no free water or any signs of destabilization, as indicated in Table 11 (CNF) and Table 12 (CNC).

TABLE 11

Stability test results of cement slurries with bentonite and CNF after conditioning for 30 min at BHCT.

| | Free Fluid (mL/250 mL) | Time (hrs) | Temp (° F.) |
|---|---|---|---|
| Slurry (1) | 0 | 2 | 190 |
| Slurry (2) | 0 | | |
| Slurry (3) | 0 | | |
| Slurry (4) | 2 | | |
| Slurry (5) | 0 | | 150 |
| Slurry (6) | 0 | | |

TABLE 12

Stability test results of cement slurries with bentonite and CNC after conditioning for 30 min at BHCT.

| Slurry | Free Fluid (mL/250 mL) | Time (hrs) | Temp (° F.) |
|---|---|---|---|
| Baseline-14.8 | 0 | 2 | 190 |
| 0.75% CNC | 0 | | |

TABLE 12-continued

Stability test results of cement slurries with bentonite
and CNC after conditioning for 30 min at BHCT.

| Slurry | Free Fluid (mL/250 mL) | Time (hrs) | Temp (° F.) |
|---|---|---|---|
| 1.00% CNC | 0 | | |
| Baseline-13.5 | 0 | | |
| 1.40% CNC | 4 | | |

Embodiments of the present disclosure provide cement slurries and methods for treating a subterranean formation with such cements slurries that include an aqueous base fluid, a cement, and a plurality of cellulose nanofibers dispersed the aqueous base fluid, where the plurality of cellulose nanofibers act as an extender, providing a slurry density of not higher than 15 lb/gal. Additionally, the cellulose nanofibers used herein does not affect stability of the slurry. The cement extender of the present disclosure may enable operators to engineer lightweight slurries with positive rheological properties that improve slurry stability and fluid displacement in the annulus while maintaining simplicity in the operation. Furthermore, the cement slurries of the present disclosure may provide reduced environmental risks, as they are biodegradable.

Although the preceding description has been described herein with reference to particular means, materials, and embodiments, it is not intended to be limited to the particulars disclosed herein; rather, it extends to all functionally equivalent structures, methods and uses, such as are within the scope of the appended claims.

What is claimed:

1. A method for treating a subterranean formation penetrated by a wellbore, the method comprising:
    injecting a cement slurry having a slurry viscosity into the wellbore, the slurry comprising:
        an aqueous base fluid having an aqueous base fluid viscosity;
        a cement; and
        a plurality of cellulose nanofibers having a surface packed with a plurality of hydroxyl groups dispersed in the aqueous base fluid,
    modifying or converting the plurality of hydroxyl groups with sulfate or phosphate ester groups and/or by carboxylation so that the cellulose nanofibers are initially inactive, wherein the cellulose nanofibers do not increase the slurry viscosity or the aqueous base fluid viscosity more than about 1.05 times;
    activating said cellulose nanofibers via a trigger to increase yield stress of the cement slurry and/or the slurry viscosity, wherein a density of the cement slurry does not exceed 15 lb/gal; and
    setting the cement slurry.

2. The method of claim 1, further comprising performing a downhole operation.

3. The method of claim 1, wherein the injecting comprises pumping the cement slurry through the wellbore and into an annulus formed between the wellbore and a casing.

4. The method of claim 1, wherein the density of the cement slurry ranges from about 6 to about 15 lb/gal.

5. The method of claim 1, wherein the plurality of cellulose nanofibers further increases a slurry yield by 1 to 3 cubic feet per sack depending on the density of the cement slurry.

6. The method of claim 1, wherein the plurality of cellulose nanofibers is present in the cement slurry in a concentration ranging from about 0.03 to about 6% by weight of a blend.

7. The method of claim 1, wherein the cellulose nanofibers are selected from the group of cellulose nanofibrils and cellulose nanocrystals.

8. The method of claim 1, wherein the cellulose nanofibers have a length ranging from about 100 nm to about 3 mm.

9. The method of claim 1, wherein the cellulose nanofibers have a diameter ranging from about 4 nm to about 20 µm.

10. The method of claim 1, wherein the cement slurry further comprises at least an additive selected from the group of fly ash, silica, cenospheres, a dispersant, a retarder, an antifoaming agent, a fluid loss control additive or a combination thereof.

11. The method of claim 1, wherein the cement slurry further comprises a gas and a foaming agent.

12. The method of claim 1, wherein the trigger is activated and the cellulose nanofibers form a single-phase colloidal suspension or gel.

13. The method of claim 1, wherein the cellulose nanofibers are cellulose nanofibrils and a concentration of cellulose nanofibrils in the cement slurry increases at least 0.1% by weight of a blend of all solid materials in the cement slurry.

14. The method of claim 1, wherein the cellulose nanofibers are cellulose nanocrystals and a concentration of cellulose nanocrystals in the cement slurry increases at least 0.25% by weight of a blend of all solid materials in the cement slurry.

15. A method for treating a subterranean formation penetrated by a wellbore, the method comprising:
    injecting a cement slurry having a slurry viscosity into the wellbore, the slurry comprising:
        an aqueous base fluid having an aqueous base fluid viscosity;
        a cement; and
        a plurality of cellulose nanofibers having a surface packed with a plurality of hydroxyl groups dispersed in the aqueous base fluid,
    modifying or converting the plurality of hydroxyl groups with sulfate or phosphate ester groups and/or by carboxylation so that the cellulose nanofibers are initially inactive, wherein an initial addition of the plurality of cellulose nanofibers to the aqueous fluid does not raise a viscosity of the cement slurry by more than 1.05 times;
    activating said cellulose nanofibers by reaching a target treatment zone, temperature or shear rate, wherein the cellulose nanofibers form a single-phase colloidal suspension; and
    setting the cement slurry.

16. The method of claim 15, wherein the cellulose nanofibers are cellulose nanofibrils and a concentration of cellulose nanofibrils in the cement slurry increases at least 0.1% by weight of a blend of all solid materials in the cement slurry.

17. The method of claim 15, wherein the cellulose nanofibers are cellulose nanocrystals and a concentration of cellulose nanocrystals in the cement slurry increases at least 0.25% by weight of a blend of all solid materials in the cement slurry.

* * * * *